United States Patent [19]

Yamamura et al.

[11] Patent Number: 5,044,660
[45] Date of Patent: Sep. 3, 1991

[54] SUSPENSION CONTROL SYSTEM FOR AUTOMOTIVE VEHICLE WITH ADJUSTMENT OF WHEEL SLIPPAGE DEPENDENT WHEEL LOAD DISTRIBUTION

[75] Inventors: Tomohiro Yamamura; Fukashi Sugasawa; Masatsugu Yokote; Takashi Imaseki, all of Kanagawa, Japan

[73] Assignee: Nissan Motor Company, Limited, Japan

[21] Appl. No.: 462,408

[22] Filed: Jan. 9, 1990

[30] Foreign Application Priority Data

Jan. 10, 1989 [JP] Japan ................................. 1-1363

[51] Int. Cl.$^5$ ............................................. B60G 11/26
[52] U.S. Cl. ..................... 280/707; 280/709; 280/711; 267/64.16; 364/424.05
[58] Field of Search ............ 280/707, 709, 6.12, 280/711; 364/424.05, 426.02; 188/299; 267/64.16; 303/100

[56] References Cited

U.S. PATENT DOCUMENTS 4,361,346 11/1982 Harris ........................ 267/64.16
4,651,290 3/1987 Masaki et al. ..................... 280/707

FOREIGN PATENT DOCUMENTS

| 60-183215 | 9/1985 | Japan | 280/707 |
| 61-67606 | 4/1986 | Japan | 267/64.16 |
| 62-4620 | 1/1987 | Japan | 280/707 |
| 62-50213 | 3/1987 | Japan | 280/707 |
| 1-95922 | 4/1989 | Japan | 280/707 |

Primary Examiner—David M. Mitchell
Assistant Examiner—Tamara L. Finlay
Attorney, Agent, or Firm—Lowe, Price, LeBlanc & Becker

[57] ABSTRACT

A suspension control system includes a mechanism for monitoring wheel slippage on each of individual wheels as a parameter represenatative of road/tire traction. Suspension control is performed generally according to the vehicle driving conditions reflected in various suspension control parameters, such as vehicular speed, lateral acceleration and so forth in order to adjust spring coefficient or damping characteristics of a suspension system which is provided between a vehicle body and a suspension member supporting each individual wheel in order to adjust wheel load distribution and whereby to minimize variation of vehicular attitude change. Suspension control is further performed with taking the road/tire friction as one of suspension control parameters in order to provide traction dependent wheel load distribution.

18 Claims, 7 Drawing Sheets

SUSPENSION CONTROL SYSTEM FOR AUTOMOTIVE VEHICLE WITH ADJUSTMENT OF WHEEL SLIPPAGE DEPENDENT WHEEL LOAD DISTRIBUTION

BACKGROUND OF THE INVENTION

1. Field of the Invention

The present invention relates generally to a suspension control system for an automotive vehicle. More specifically, the invention relates to a technologies for adjusting wheel load distribution depending upon wheel slippage for stability of vehicular driving behavior.

2. Description of the Background Art

Japanese Patent First (unexamined) Publication (Tokkai) Showa 62-275814 discloses a sort of an active suspension system which acts in active manner for suppressing vehicular body attitude change according to vehicle driving condition and thus achieves both of vehicular riding comfort and driving stability. Such prior proposed suspension control system adjusts wheel load distribution in order to suppress vehicular body attitude change, such as pitching and rolling. Particularly, the disclosed invention in the prior proposal concerns anti-rolling suspension control for adjusting wheel distribution for left and right side wheels so as to appropriately adjusting cornering force. Namely, according to the prior proposal, wheel load distribution is so adjusted as to resist against yawing moment which is induced by lateral acceleration generated by driving and braking force exerted on the vehicle. Such prior proposed system is successful in accomplishing minimization of variation of cornering force and whereby providing better cornering performance of the vehicle.

On the other hand, such prior proposed system still holds a drawback to be improved for providing better balance or higher stability of the vehicle. Namely, in the prior proposal, road surface friction or road/tire traction which reflects wheel slippage at each individual wheel, has not been taken into account in controlling the wheel load distribution. The factor of road/tire traction becomes particularly important for providing satisfactorily high vehicular driving stability during cornering or braking at a condition close to critical points. Namely, when traction is relatively low, there is a possibility of breaking of traction for causing abrupt vehicular attitude change for falling the vehicle in unstable condition.

SUMMARY OF THE INVENTION

Therefore, it is an object of the present invention to provide a suspension control system which can achieves higher stability of the vehicle by providing improvement for the aforementioned unsolved drawback in the prior art.

Another object of the invention is to provide a suspension control system which adjusts wheel load distribution with taking the condition of road/tire traction into account.

In order to accomplish aforementioned and other objects, a suspension control system, according to the present invention, includes means for monitoring wheel slippage on each of individual wheels as a parameter representative of road/tire traction. Suspension control is performed generally according to the vehicle driving conditions reflected in various suspension control parameters, such as vehicular speed, lateral acceleration and so forth in order to adjust spring coefficient or damping characteristics of a suspension system which is provided between a vehicle body and a suspension member supporting each individual wheel in order to adjust wheel load distribution and whereby to minimize variation of vehicular attitude change. Suspension control is further performed with taking the road/tire friction as one of suspension control parameters in order to provide traction dependent wheel load distribution.

According to one aspect of the invention, a suspension control system comprises:
a suspension system disposed between a vehicle body and a suspension member pivotably mounted on a vehicle body and rotatably supporting a road wheel;
first means, associated with the suspension system, for adjusting suspension characteristics for adjusting load exerted on the road wheel;
second means, for monitoring preselected suspension control parameter for providing a first parameter data;
third means for monitoring state of traction at the road wheel for producing a second parameter data; and
fourth means, receiving the first and second parameter data, for controlling operation of the first means, the fourth means being active in a first mode while the second parameter data is greater than or equal to a predetermined threshold level, for controlling operation of the first means on the basis of the first parameter data, and a second mode while the second parameter data is smaller than the predetermined threshold level, for controlling operation of the first means so as to increase traction so that the second parameter data becomes greater than or equal to the predetermined threshold level.

The suspension system may comprise an active suspension system including a cylinder which has a variable pressure chamber for adjusting suspension characteristics, the variable pressure chamber being connected to the a pressure control circuit including a pressure source unit and the first means comprising a pressure control valve which controls supplying and draining the fluid pressure in the variable pressure chamber. In such case, the fourth means operates in the second mode for supplying control signal for the pressure control valve in order to modify the fluid pressure in the variable pressure chamber derived on the basis of the first parameter data to be higher level in a predetermined magnitude. Preferably, the fourth means derives the additional magnitude of pressure depending upon the level of traction in relation to the threshold level.

In the alternative, the suspension system may comprise a pneumatic suspension including a variable volume chamber which is connected to a pressurized air source, the first means comprises a pressure control means disposed within a circuit connecting the pressurized air source and the variable volume chamber for adjusting pressure in the variable volume chamber for adjusting suspension characteristics. In such case, fourth means may operate in the second mode for supplying control signal for the pressure control valve in order to modify the air pressure in the variable volume chamber derived on the basis of the first parameter data to be higher level in a predetermined magnitude. Also, the fourth means may derive the additional magnitude of pressure depending upon the level of traction in relation to the threshold level.

In the further alternative, the suspension system comprises a variable stabilizer comprising a pair of first and second cylinders, the first cylinder defining a first upper and second lower chambers opposing across a first thrusting piston, the second cylinder defining a third upper and fourth lower chambers opposing across a second thrusting piston, the first chamber being communicated with the fourth chamber via a first line and the second chamber being communicated with the third chamber via a second line, and the first means being provided in the first and second lines for adjusting set pressure therein. Preferably, the first means comprises a pressure accumulator variable of set pressure thereof; which pressure accumulator being connected to each of the first and second lines.

According to another aspect of the invention, a suspension control system comprises:

a suspension system disposed between a vehicle body and a suspension member pivotably mounted on a vehicle body and rotatably supporting a road wheel;

first means, associated with the suspension system, for adjusting suspension characteristics for adjusting load exerted on the road wheel;

second means, for monitoring preselected suspension control parameter for providing a first parameter data;

third means for monitoring state of wheel slippage at the road wheel for producing a second parameter data; and fourth means, receiving the first and second parameter data, for controlling operation of the first means, the fourth means being active in a first mode while the second parameter data is smaller than or equal to a predetermined threshold level, for controlling operation of the first means on the basis of the first parameter data, and a second mode while the second parameter data is greater than the predetermined threshold level, for controlling operation of the first means so as to increase wheel slippage so that the second parameter data becomes smaller than or equal to the predetermined threshold level.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 5 is a chart showing relationship between the wheel slippage and driving and braking force;

DESCRIPTION OF THE PREFERRED EMBODIMENT

Referring now to the drawings, it should be initially noted that the preferred embodiment of a suspension control system, according to the present invention, is applicable for various constructions of vehicular suspension systems which have capabilities of adjusting of suspension characteristics and whereby have capability of adjusting wheel load distribution. Therefore, it should be clearly appreciated that the suspension systems discussed herebelow are mere examples of application of the preferred embodiment of the suspension control system according to the invention.

Figure 1:
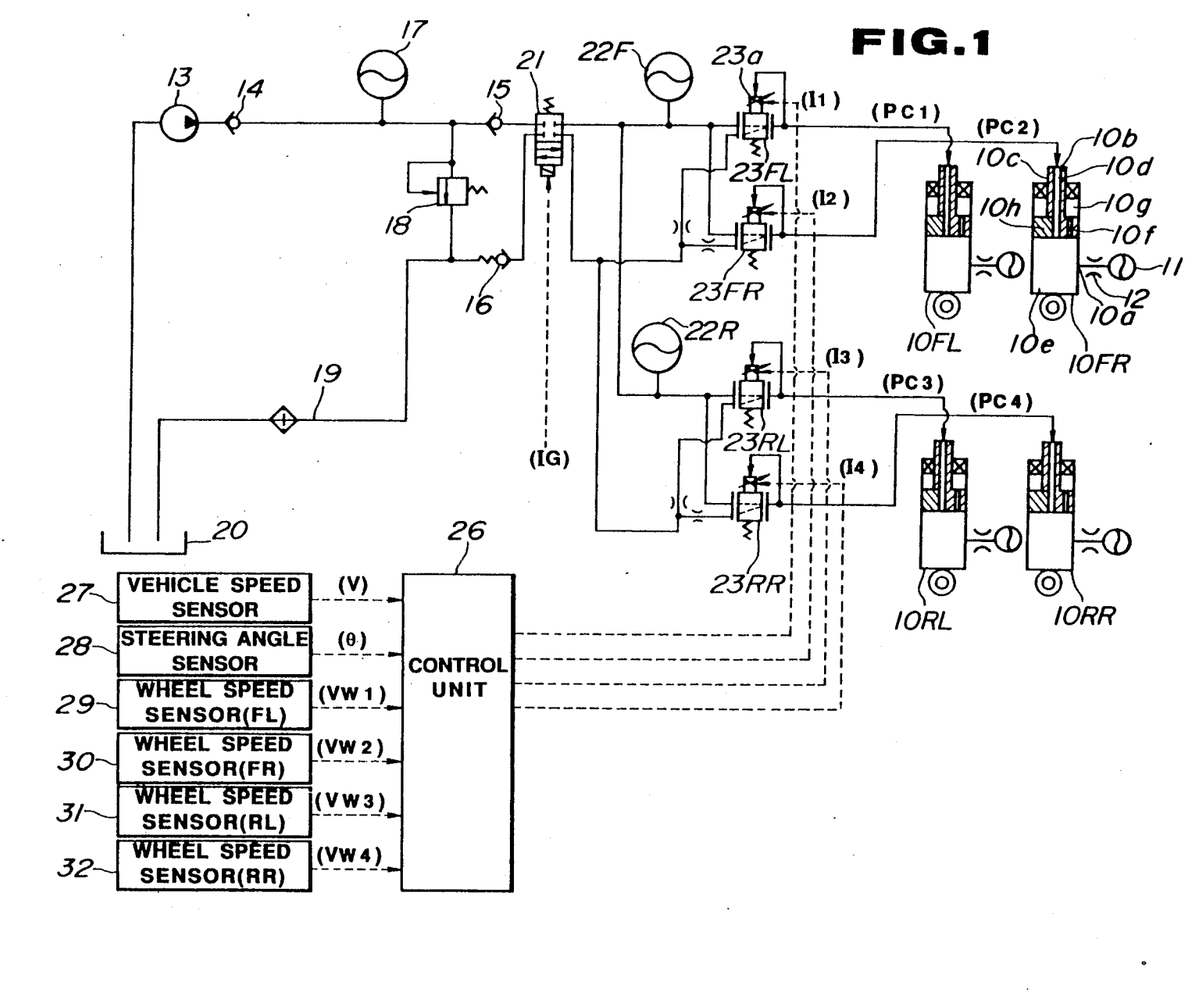
FIG. 1 is a circuit diagram of a hydraulic active suspension system for which the preferred embodiment of a suspension control system is applicable.

Referring to FIG. 1, a hydraulic active suspension system includes hydraulic cylinders 10FL, 10FR, 10RL and 10RR for respective of front-left, front-right, rear-left and rear-right wheels. As can be appreciated, each hydraulic cylinder 10FL, 10FR, 10RL and 10RR is connected to a vehicle body (not shown) at the top of a piston rod 10c rigidly connected to a piston 10h and to a suspension member (not shown) rotatably supporting corresponding one of front-left, front-right, rear-left and rear-right wheels and pivotably supported on a vehicle body. As can be seen, the piston divides the interior space of the hydraulic cylinder in to upper and lower fluid chambers 10g and 10e. Each of the hydraulic cylinders 10FL, 10FR, 10RL and 10RR has a communication port 10a for establishing fluid communication between the lower fluid chamber 10e and a pressure accumulator 11 via a flow restriction orifice 12. On the other hand, the upper and lower fluid chambers 10g and 10e are communicated with each other via an axially extending flow restriction orifice 10f. The orifices 12 and 10f serve for restricting fluid flow therethrough for inducting fluid pressure difference between the upper and lower fluid chambers 10g and 10e and thus generate damping force.

For respective of the upper chambers 10g of the hydraulic cylinders 10FL, 10FR, 10RL and 10RR, control pressures $Pc_1$, $Pc_2$, $Pc_3$ and $Pc_4$ are introduced from a hydraulic pressure control circuit which will be discussed later. The control pressure $Pc_1$, $Pc_2$, $Pc_3$ and $Pc_4$ serve for adjusting fluid pressure in the upper fluid chamber 10g. The adjusting fluid pressure in the upper fluid chamber 10g is gradually transferred to the lower fluid chamber 10e via the flow restriction orifice 10f. According to variation of the fluid pressure in the upper fluid chamber 10g, the piston 10h strokes up and down according to pressure difference between the upper and lower fluid chambers 10g and 10e to establish hydraulic force balance between the forces exerted on the upper and lower sides of the piston. Since the piston carries the piston rod 10c, the relative distance between the vehicle body and the suspension member is adjusted according to the piston stroke. Therefore, by adjusting the control pressure $Pc_1$, $Pc_2$, $Pc_3$ and $Pc_4$ to be introduced into the upper fluid chamber 10g, the relative distance between the vehicle body and the suspension member can be appropriately adjusted. On the other hand, the pressure accumulator 11 as well as the orifices 12 and 10f serves for absorbing pressure variation and damping movement of the piston and thus effective for absorbing high frequency and low amplitude vibration energy such as that induced by road shock.

As seen from FIG. 1, the hydraulic control circuit includes a fluid pump 13, one-way check valves 14, 15 and 16, a pressure accumulator 17, a pressure relief valve 18, an oil cooler 19, a fluid reservoir 20 and a shut-off valve 21. These components form a pressure source circuit in the hydraulic control circuit for generating hydraulic pressure and distributing generated hydraulic pressure to respective of the hydraulic cylinders 10FL, 10FR, 10RL and 10RR. Namely, while the fluid pump 13 is driven, the hydraulic pressure is circulated through a hydraulic circuit. The maximum line pressure of a supply line is determined by a set pressure in the pressure relief valve 18 by draining excessive pressure to the fluid reservoir 20 via a drain line. On the other hand, the shut-off valve 21 is associated with a main power switch, such as an ignition switch 1G, so that the valve is held in open position while the main power switch is ON and responsive to turning OFF to switch the valve into shut-off position for blocking fluid communication between the pressure source circuit and the hydraulic cylinders 10FL, 10FR, 10RL and 10RR for maintaining the fluid pressure therein. Proportioning solenoid valves 23FL, 23FR, 23RL and 23RR are provided between the pressure source circuit and the hydraulic cylinders 10FL, 10FR, 10RL and 10RR for generating control pressures $Pc_1$, $Pc_2$, $Pc_3$ and $Pc_4$ to be supplied to the hydraulic cylinders, which valves therefore serve as pressure control valve. When the ignition switch IG is turned ON, the line pressure of the supply line is supplied through an accumulator 22F, the solenoid valves 23FL and 23 FR, to the cylinders 10FL and 10FR, as the control pressure $Pc_1$ and $Pc_2$. Likewise, when the ignition switch IG is turned ON, the line pressure of the supply line is supplied through an accumulator 22R, the solenoid valves 23RL and 23RR, to the cylinders 10RL and 10RR, as the control pressure $Pc_3$ and $Pc_4$. Each of the proportioning solenoid valves 23FL, 23FR, 23RL and 23RR incorporates a proportioning solenoid 23a for adjusting pilot pressure in the pressure control valves 23FL, 23FR, 23RL and 23RR.

Figure 2:
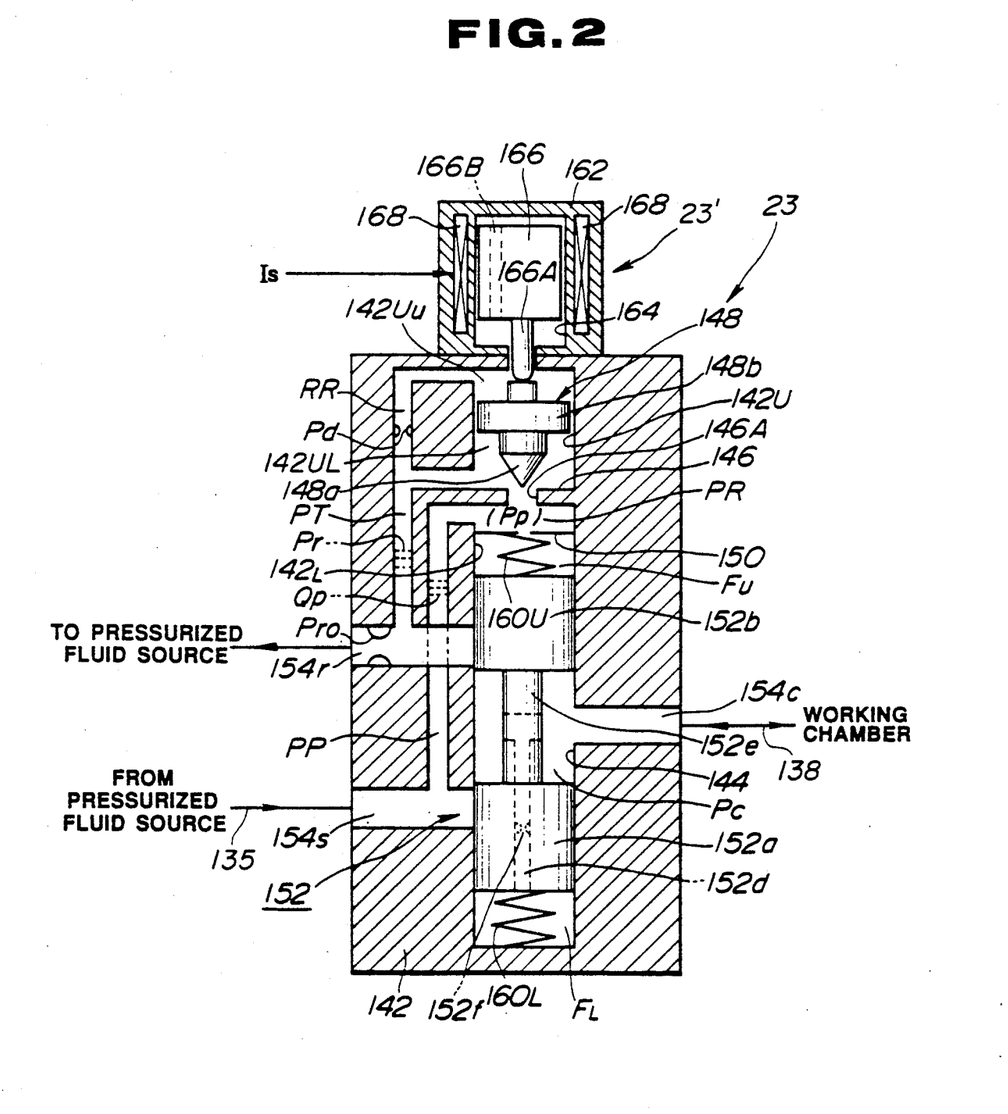
FIG. 2 is a section of one example of a pressure control valve to be employed in the hydraulic active suspension system of FIG. 1.

FIG. 2 shows one example of the pressure control valve applicable for the shown construction of the active suspension system.

In the construction of the pressure control valve shown in FIG. 2, the pressure control valve 23 includes a valve housing 142. The valve housing 142 defines a valve bore 144 which is separated in to a valve chamber 142L and a control chamber 142U by means of a partitioning wall 146. The partitioning wall 146 is formed with a communication path opening 146A for communication between the control chamber 142U and the valve chamber 142L. As seen from FIG. 2, the control chamber 142U and the valve chamber 142L are arranged in alignment to each other across the communication path opening 146A. In parallel to a section of the partitioning wall 146 extending perpendicular to the axis of the valve chamber 142L and the control chamber 142U, a fixed orifice defining partitioning member 150 is provided. The partitioning member 150 defines a throttling orifice which is oriented substantially in alignment with the communication path opening 146A. The partitioning wall 146 and the partitioning member 150 are cooperative for defining a pilot chamber PR therebetween.

A valve spool 152 is thrustingly and slidingly disposed within the valve chamber 142L. The valve spool 152 defines an upper feedback chamber FU between the tip end thereof and the partitioning member 150. The valve spool 152 also defines a lower feedback chamber FL between the other tip end thereof and the bottom of the valve chamber 142L. Offset springs 160U and 160L are disposed within the upper and lower feedback chambers FU and FL, which offset springs exerts spring force to the valve spool 152 for resiliently restricting movement of the latter. Resilient force of the offset springs 160U and 160L are so set as to balance to place the valve spool 152 at a neutral position, when the fluid pressure in the upper and lower feedback chambers FU and FL balances to each other. The valve chamber 142L is communicated with a supply line 135 via an supply port 154s, the drain line via a drain port 154r and a pressure control line 138 via a control port 154c, which supply port, drain port and control port are defined in the valve housing 142. The valve spool 152 at the aforementioned neutral position, blocks fluid communication of the pressure control chamber PC with any of the supply port 154s and the drain port 154r. As a result, as long as the valve spool 152 is maintained at the neutral position, overall fluid force in the hydraulic circuit downstream of the pressure control valve, which circuit includes the upper fluid chamber 10g of the hydraulic cylinder 10 is held constant.

The valve spool 152 is formed with lands 152a and 152b connected to each other via smaller diameter bar-like section 152e. The land 152a is oriented adjacent the lower feedback chamber FL so as to subject the tip end to the fluid pressure in the lower feedback chamber. Similarly, the land 152b is oriented adjacent the upper feedback chamber FU so as to subject the tip end to the fluid pressure in the upper feedback chamber. The bar-like section 152e between the lands 152a and 152b is cooperative with the peripheral wall of the valve chamber 142L in order to define therebetween a pressure control chamber PC. A fluid flow path 152d is formed through the valve spool 152. The fluid flow path 152d has one end communicated with the pressure control chamber PC and the other end communicated with the lower feedback chamber FL. A fixed flow restricting orifice 152f is formed in the fluid flow path 152d for restricting fluid flow therethrough.

A poppet valve member 148 is disposed within the control chamber 142U for thrusting movement therein. The poppet valve member 148 has a valve head 148a of an essentially conical configuration. The valve head 148a opposes to the communication path opening 146A of the partitioning wall 146. The poppet valve member 148 is operably associated with a proportioning solenoid assembly 23' as the actuator. The proportioning solenoid assembly 23' comprises a housing 162 rigidly secured on the valve housing 142 and defining an internal space 164 to receive therein a plunger 166. The plunger 166 has a plunger rod 166A. The tip end of the plunger rod 166A is kept in contact with the tip end of the poppet valve member 148 remote from the valve head 148a. Therefore, the poppet valve member 148 is axially driven by means of the plunger 166 to control the path area in the communication path opening 146A according to the position of the tip end of the plunger rod 166A. Adjusting of the path area in the communication path opening 146A results in variation of fluid pressure to be introduced into the pilot chamber PR.

In order to control the position of the plunger 166 with the plunger rod 166A, a proportioning solenoid coil 168 is housed within the housing 162 and surrounds the plunger 166. The interior space of the housing 162 is connected to the control chamber 142U for fluid communication therebetween. The plunger 166 is formed with a fluid path 166B for fluid communication between upper and lower sections of the interior space. Therefore, the fluid pressure in the upper and lower sections of the interior space of the housing 162 is held equal to the pressure in the control chamber 142U. This cancels fluid pressure to be exerted on the poppet valve and the plunger so that the position of the tip end of the plunger rod 166A can be determined solely depending upon the magnitude of energization of the proportioning solenoid coil 168.

As seen from FIG. 2, the poppet valve member 148 has a cylindrical larger diameter section 148b for separating the control chamber 142U into upper section and lower section 142Uu and 142Ul. The upper and lower sections 142Uu and 142Ul are communicated with the drain port 154r via a pilot return path PT. A multi-stage orifice Pr is provided in the pilot return path PT for restricting fluid flow therethrough. The multi-stage orifice Pr comprises a plurality of strips formed with through openings and is so designed that one of the orifice oriented at most upstream side is mainly effective for restricting fluid flow when fluid flowing therethrough is steady flow and that all of the orifices of respective strips are equally effective for restricting fluid flow when fluid flow therethrough is disturbed and not steady. Therefore, as will be appreciated herefrom, the multi-stage orifice Pr employed in the shown embodiment serves to provide greater fluid flow restriction against non-steady or disturbed fluid flow than that for the steady flow. As seen from FIG. 2, the multi-stage orifice Pr is provided upstream of the upper and lower sections 142Uu and 142Ul. On the other hand, a fixed throttling orifice Pd is provided at an orientation downstream of the lower section 142Ul and upstream of the upper section 142Uu. Similarly, the pilot chamber PR is communicated with the supply port 154s via a pilot path PP. A multi-stage orifice Qp which has similar construction and flow restricting function to that of the multi-stage orifice Pr is provided in the pilot path PP.

A fixed throttle orifice Pro is also provided in the drain port 154r for restricting fluid flow therethrough. The diameter of the fluid path at the orifice Pro is so selected as to create great flow restriction against pulsatile fluid flow cyclically varying the fluid pressure at a frequency approximately 1 Hz.

As can be seen from FIG. 2, the pressure control valve 23 is so arranged as to direct the axis of the valve bore 144 parallel to the longitudinal axis of the vehicle body. The longitudinal acceleration to be exerted on the vehicular body is much smaller than the lateral acceleration and vertical acceleration exerted on the vehicle body. Therefore, by arranging the pressure control valve 23 so that the poppet valve 148 and the valve spool 152 thrustingly move in longitudinal direction, influence of the externally applied acceleration can be minimized.

Figure 3:
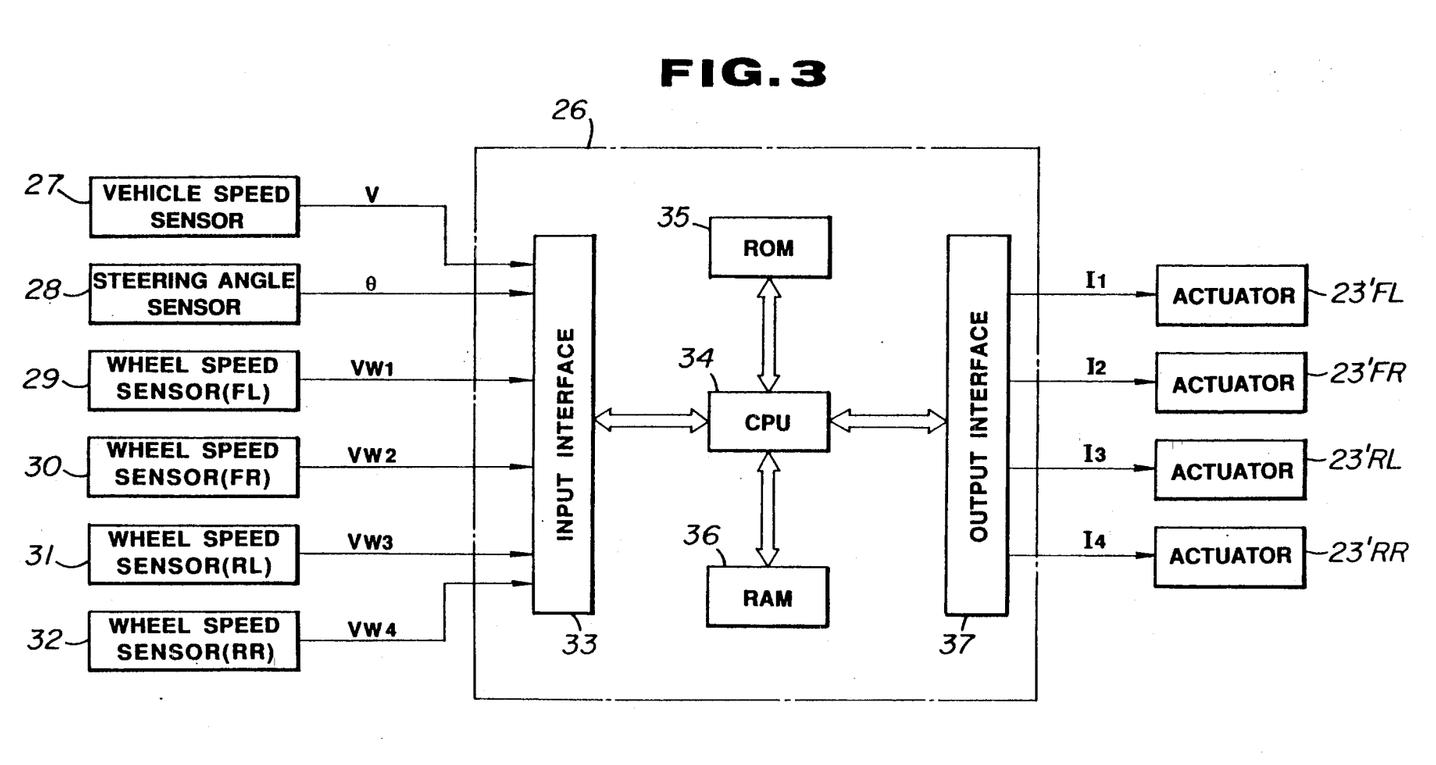
FIG. 3 is a schematic block diagram of the preferred embodiment of the suspension control system according to the invention.

As seen from FIGS. 1 and 3, a control unit 26 is provided in order to determine control signals $I_1$, $I_2$, $I_3$ and $I_4$ for the actuators 23'FL, 23'FR, 23'RL and 23'RR of respective pressure control valves 23FL, 23FR, 23RL and 23RR, according to a preselected suspension control parameters. In the shown embodiment, a vehicle speed V and a steering angle displacement $\theta$ are selected as suspension control parameters. For providing the vehicle speed data V and the steering angular displacement data $\theta$, a vehicle speed sensor 27 and a steering angle sensor 28 are connected to the control unit 26. As will be appreciated, based on the steering angle data $\theta$ and the vehicle speed data V a data representative of vehicular attitude change can be derived.

The control unit 26 comprises an input inter face 33, CPU 34, ROM 35, RAM 36 and an output interface 37. For the input interface, wheel speed sensors 29, 30, 31 and 32 are respectively designed for monitoring rotation speed of respectively corresponding one of front-left, front-right, rear-left and rear-right wheels for producing front-left, front-right, rear-left and rear-right wheel speed indicative signals $Vw_1$, $Vw_2$, $Vw_3$ and $Vw_4$. The control unit 26 derives a vehicle speed representative values $V_1$, $V_2$, $V_3$ and $V_4$ on the basis of the vehicle speed data V and the steering angle data $\theta$. Based on the vehicle speed representative values $V_1$, $V_2$, $V_3$ and $V_4$ and the wheel speed indicative signals $Vw_1$, $Vw_2$, $Vw_3$ and $Vw_4$, the control unit 26 derives wheel slippage $S_1$, $S_2$, $S_3$ and $S_4$ utilizing the following equations:

During Acceleration
$$Si = 1 - Vi/(r_0 \times Vw_i) \qquad (1)$$

During Deceleration (Braking)
$$Si = 1 - (r_0 \times Vw_i)/Vi \qquad (2)$$

wherein $r_0$ is tire load diameter;

$i$ is 1, 2, 3 and 4

The control unit 26 performs tire/road traction dependent suspension control with taking the wheel splippage $S_1$, $S_2$, $S_3$ and $S_4$ as the tire/road friction representative data.

Figure 4:
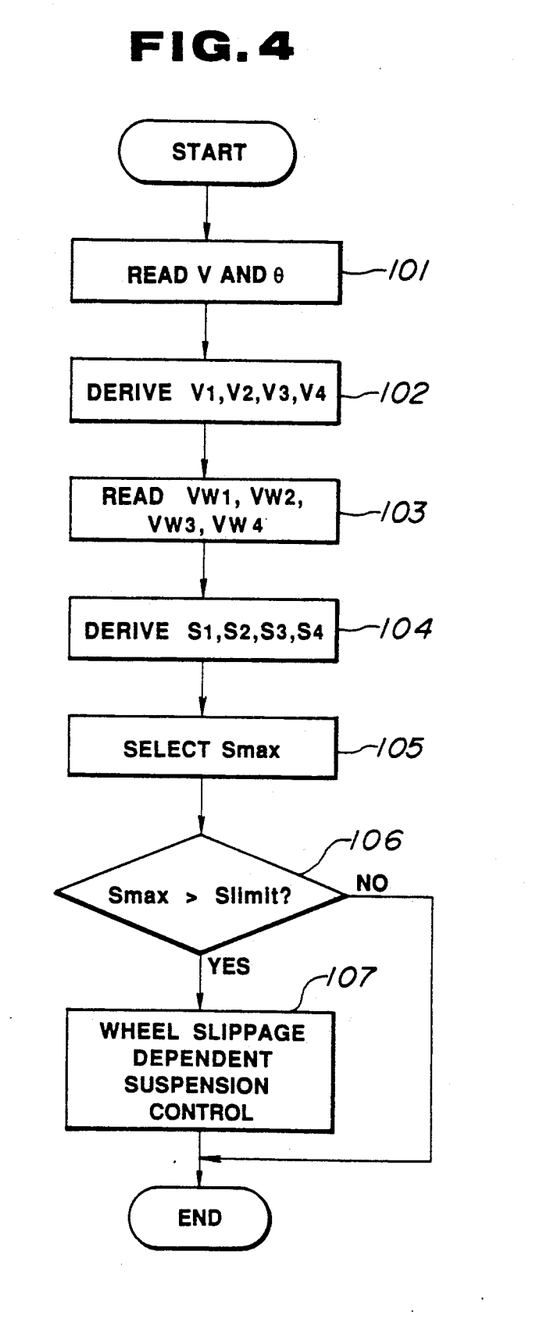
FIG. 4 is a flowchart of a wheel load distribution controlling routine to be executed by the preferred embodiment of the suspension control system according to the invention.

The preferred process of tire/road traction dependent suspension control will be discussed herebelow with reference to the flowchart in FIG. 4. As will be appreciated, the control unit 26 in the automotive vehicle performs various control operations, such as engine control, brake control, suspension control and so forth. Therefore, the shown routine in FIG. 4 is triggered at every predetermined timing, such as every 20 ms.

At a step 101, the vehicle speed indicative data V, the steering angle data $\theta$ are read out. Based on the vehicle speed indicative data V and the steering angle data $\theta$ and with taking specification of the vehicle for which the suspension control system is applied, the vehicle speed data $V_1$, $V_2$, $V_3$ and $V_4$ at respective of the front-left, front-right, rear-left and rear-right wheels are derived as reference values for deriving wheel slippage at respective wheels, at a step 102. Subsequently, the wheel speed indicative data $Vw_1$, $Vw_2$, $Vw_3$ and $Vw_4$ are read out at a step 103. Based on the vehicle speed data $V_1$, $V_2$, $V_3$ and $V_4$ and the wheel speed indicative data $Vw_1$, $Vw_2$, $Vw_3$ and $Vw_4$, wheel slippages $S_1$, $S_2$, $S_3$ and $S_4$ are derived according to one of the equations (1) and (2), at a step 104. Based on the wheel slippage data $S_1$, $S_2$, $S_3$ and $S_4$ derived at the step 104, the wheel having the maximum wheel slippage $S_{max}$ is selected at a step 105. Then, the maximum wheel slippage indicative value $S_{max}$ is compared with a predetermined wheel slippage threshold $S_{limit}$ at a step 106. When the maximum wheel slippage $S_{max}$ is smaller than or equal to the wheel slippage threshold $S_{limit}$, judgement is made that wheel slippage is not substantial and within the acceptable range. If this is the case. process directly goes END. Therefore, normal suspension control irrespective of the wheel slippage is performed in another routine. The process of suspension control in another routine has been known in various ways. The followings are examples showing suspension control to be applied for active suspension system. U.S. patent application Ser. No. 052,934, filed on May 22, 1987, U.S. Pat. No. 4,903,983:

U.S. patent application Ser. No. 059,888, filed on June 9, 1987, corresponding European Patent Application has been published as First Publication No. 02 49 209:

U.S. patent application Ser. No. 060,856, filed on June 12, 1987, corresponding European Patent Application has been published as First Publication No. 02 49 227:

U.S. patent application Ser. No. 060,909, filed on June 12, 1987, U.S. Pat. No. 4,909,534:

U.S. patent application Ser. No. 060,911, filed on June 12, 1987, U.S. Pat. No. 4,801,155:

U.S. patent application Ser. No. 176,246, filed on Mar. 31, 1988, U.S. Pat. No. 4,888,696 the corresponding European Patent Application has been published as First Publication No. 02 85 153:

U.S. patent application Ser. No. 178,066, filed on Apr. 5, 1988, U.S. Pat. No. 4,848,790, the corresponding European Patent Application has been published as First Publication No. 02 86 072:

U.S. patent application Ser. No. 167,835, filed on Mar. 4, 1988, U.S. Pat. No. 4,865,348:

U.S. patent application Ser. No. 244,008, filed on Sept. 14, 1988, U.S. Pat. No. 4,938,499:

U.S. patent application Ser. No. 255,560, filed on Oct. 11, 1988, U.S. Pat. No. 4,943,084:

U.S. patent application Ser. No. 266,763, filed on Nov. 3, 1988, U.S. Pat. No. 4,967,360:

U.S. patent application Ser. No. 261,870, filed on Oct. 25, 1988:

U.S. patent application Ser. No. 263,764, filed on Oct. 28, 1988, U.S. Pat. No. 4,905,152:

U.S. patent application Ser. No. 277,376, filed on Nov. 29, 1988, U.S. Pat. No. 4,919,440:

U.S. patent application Ser. No. 303,338, filed on Jan. 26, 1989:

U.S. patent application Ser. No. 302,252, filed on Jan. 27, 1989.

U.S. patent application Ser. No. 310,130, filed on Mar. 22, 1989:

U.S. patent application Ser. No. 327,460, filed on Mar. 22, 1989, U.S. Pat. No. 4,911,469:

U.S. patent application Ser. No. 303,339, filed on Jan. 26, 1989, U.S. Pat. No. 4,948,165:

U.S. patent application Ser. No. 331,602, filed on Mar. 31, 1989, U.S. Pat. No. 4,911,468:

U.S. patent application Ser. No. 331,653, filed Mar. 31, 1989, U.S. Pat. No. 4,911,470:

U.S. patent application Ser. No. 364,477, filed on June 12, 1989:

U.S. patent application Ser. No. 365,468, filed on June 12, 1989.

All of the above-identified publications and co-pending U.S. Patent applications have been assigned to the common assignee to the present invention and the disclosure thereof are herein incorporated by reference for the sake of disclosure.

On the other hand, when the maximum wheel slippage $S_{max}$ as compared at the step 106 is greater than the wheel slippage threshold $S_{limit}$, process goes to a step 107 in order to perform wheel slippage dependent suspension control. In the wheel slippage dependent suspension control, wheel load distribution is adjusted so as to reduce the wheel slippage in order to maintain the maximum wheel slippage smaller than the wheel slippage threshold. For this purpose, in the wheel speed dependent suspension control, the wheel load for the wheel having the maximum wheel slippage is increased in a magnitude derived for reducing the maximum wheel slippage down to the wheel slippage threshold.

It is general process of control in the active suspension system to independently control the wheel load for respective of individual wheels and to maintain wheel load difference in longitudinal direction and lateral direction equal to each other for maintaining the yawing moment unchanged. On the other hand, the relationship between the wheel slippage $S_i$ and the driving and braking forces is shown in FIG. 5. In FIG. 5, the curve A shows variation of wheel slippage $S_i$ versus the driving and braking force $Q_i$ when the wheel load distribution is not adjusted for exerting wheel load W. On the other hand, the curve B shows variation of the wheel slippage $S_i$ versus the driving and braking force $Q_i$ when the wheel load distribution is adjusted so that the wheel load on the wheel having the maximum wheel slippage is increased for exerted wheel load W' (W + ΔW) by the process of the preferred process.

Assuming the wheel load is W and the driving and braking force is $Qi_1$, the wheel slippage at the point X becomes $Si_1$ as shown in FIG. 5. If this wheel slippage $Si_1$ is greater than the wheel slippage threshold $S_{limit}$, cornering force is rapidly decreased to cause breakage of tire/road traction. Breaking of traction is at first caused at the wheel having the maximum wheel slippage. This breaks balance of the vehicular body to lead attitude change in the vehicle body. At this time, by reducing the wheel slippage from $Si_1$ to $Si_2$ which is smaller than or equal to the wheel slippage threshold as pointed by the point Z, the driving and braking force is undesirably reduced to $Qi_2$. Therefore, according to the present invention, by adding ΔW to the normal wheel load W, wheel slippage is reduced from $Si_1$ to $Si_2$ without causing drop of the driving and braking force $Qi_1$ as pointed at the point Y.

As can be appreciated, since the wheel slippage dependent suspension control is performed not only when the wheel slippage is caused by longitudinal or lateral acceleration, but also when the friction coefficient at the road surface is different in each individual wheel, vehicular stability on the low friction road can be assured.

Figure 6:
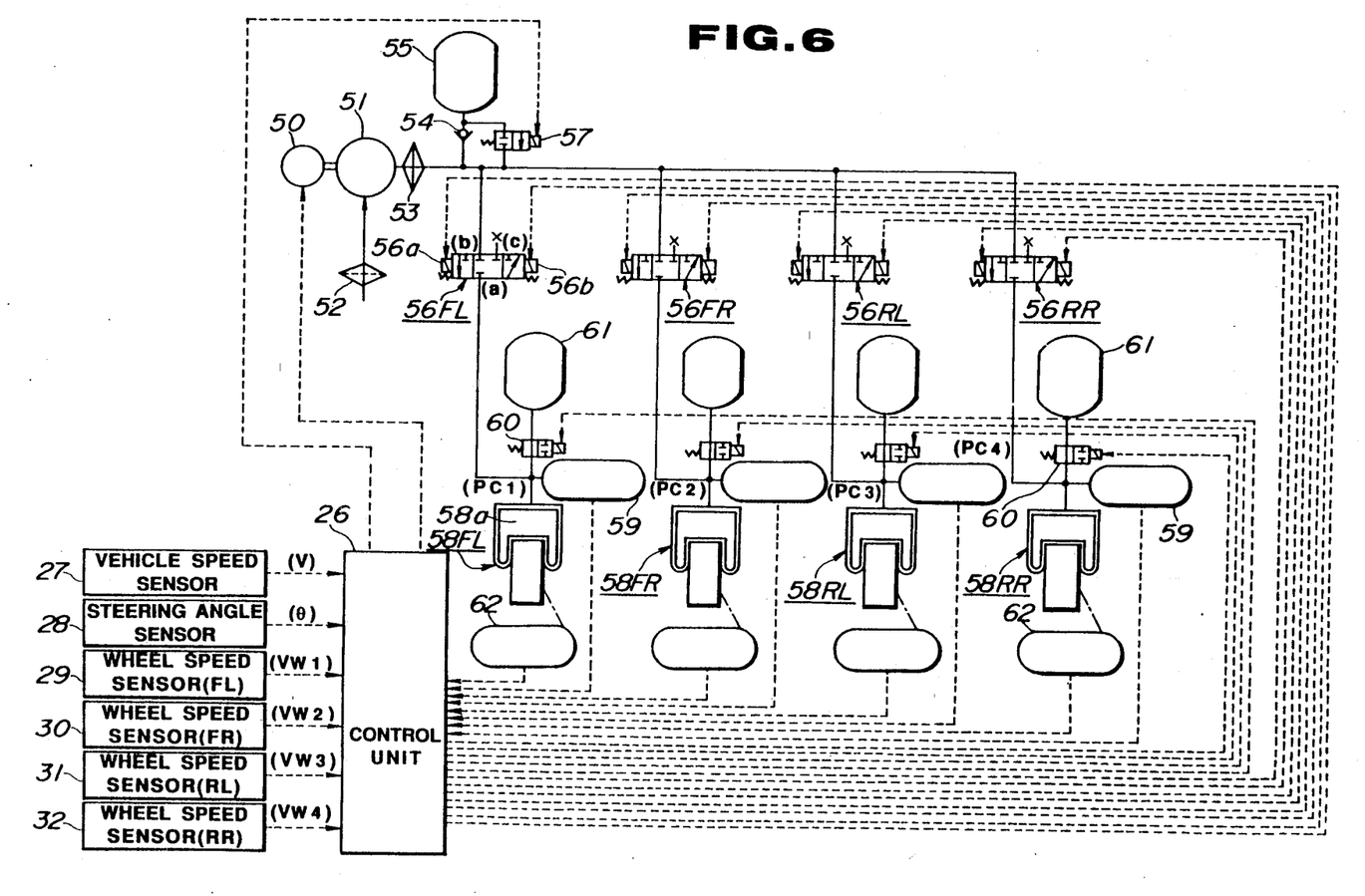
FIG. 6 is a circuit diagram of a pneumatic suspension system for which the preferred embodiment of a suspension control system is also applicable.

FIG. 6 shows a diagram of a pneumatic suspension system for which the preferred embodiment of the suspension control system is also applicable. In this embodiment, front-left, front-right, rear-left and rear-right suspension systems 58FL, 58FR, 58RL and 58RR have variable volume pneumatic chamber 58a. Each of the pneumatic chambers 58a is connected to a pressurized air source including an electric motor 50, a motor driven compressor 51 incorporating an air induction associated therewith an air filter 52, an air dryer 53. For the pressure supply line connected to the discharge outlet of the compressor via the air dryer 53, a pressure reservoir tank 55 is connected via a one-way check valve 54. A main valve 57 is also connected between the pressure supply line and the pressure reservoir tank 55. Pressure control valves 56FL, 56FR, 56RL and 56RR are provided in respective of branch line connecting the pressure supply line to the pneumatic chambers 58a of respective suspension system 58FL, 58FR, 58RL and 58RR. For respective of the pneumatic chambers 58a, sub-tanks 61 are connected via cut valves 60.

Each of the pressure control valves 56FL, 56FR, 56RL and 56RR comprises a three way valve variable of valve position between a supply position (b) for supplying air pressure Pc$_1$, Pc$_2$, Pc$_3$ and Pc$_4$ to corresponding one of the branch lines, a discharge position (c) for ventilating or discharging the air pressure in the pneumatic chamber 58a and a shut-off position (a) for blocking air communication through the branch line. As can be seen from FIG. 6, each pressure control valve 56FL, 56FR, 56RL and 56RR has a pair of electromagnetically operable solenoids 56a and 56b.

In order to control operation of the motor 50, the main valve 57, the pressure control valves 56FL, 56FR, 56RL and 56RR, and the cut valves 60, a microprocessor based control unit 26 is performed, which control unit implements the preferred suspension control according to the invention, substantially in the same manner as that in the former embodiment. Similarly to the former embodiment, the control unit 26 is connected to the vehicle speed sensor 27, the steering angle sensor 28, and the wheel speed sensors 29, 30, 31 and 32. In addition, the control unit 26 is also connected to pressure sensors 59 which monitors air pressure in respective branch lines. The control unit 26 is further connected to stroke sensors 62 which monitors relative distance between the vehicle body and the suspension member in respective suspension systems 58FL, 58FR, 58RL and 58RR.

In the shown construction, the wheel load distribution on each of the front-left, front-right, rear-left and rear-right wheels is controlled by adjusting air pressure in respective of the pneumatic chambers 58a. The pressure in the pneumatic chamber 58a is primarily controlled by the pressure control valves 56FL, 56FR, 56RL and 56RR by switching valve positions. The sub-tank 61 and the cut valves 60 are cooperative with the pressure control valve for adjustment of the air pressure in the pneumatic chambers.

In general, such pneumatic suspension system controls air pressure in the pneumatic chambers 58a in order to regulate the vehicular body height level on the basis of the vehicular height indicative data supplied from the stroke sensors 62 so as to maintain the vehicular height within a predetermined height range. Therefore, the control unit 26 normally performs height adjustment operation depending upon the vehicular body height indicative signals of the stroke sensors 62. On the other hand, the control unit controls operation of the motor 50, the main valve 57 and cut valves 60 on the basis of the pressure indicative signal from the pressure sensors 59.

The control unit 26 further performs the similar process as that discussed with respect to FIG. 5. Namely, when the maximum wheel slippage S$_{max}$ is greater than the wheel slippage threshold S$_{limit}$, wheel slippage dependent suspension control is performed so as to increase the air pressure in the pneumatic chamber of one of the suspension system 58FL, 58FR, 58RL and 58RR in a magnitude ΔW sufficient for reducing wheel slippage to be smaller than or equal to the wheel slippage threshold.

Though the specific construction of the pneumatic suspension has been discussed hereabove, the shown embodiment of the suspension control system is applicable for various constructions of the pneumatic suspension systems. The followings are variation of the pneumatic suspension systems with capability of vehicular height adjustment.

U.S. Pat. No. 4,787,644, issued on Nov. 29, 1988
U.S. Pat. No. 4,659,104, issued on Apr. 21, 1987
U.S. Pat. No. 4,718,695, issued on Jan. 12, 1988.

All of the above-identified U.S. Patents have been assigned to the common assignee to the present invention, the disclosure which are herein incorporated by reference for the sake of disclosure.

Figure 7:
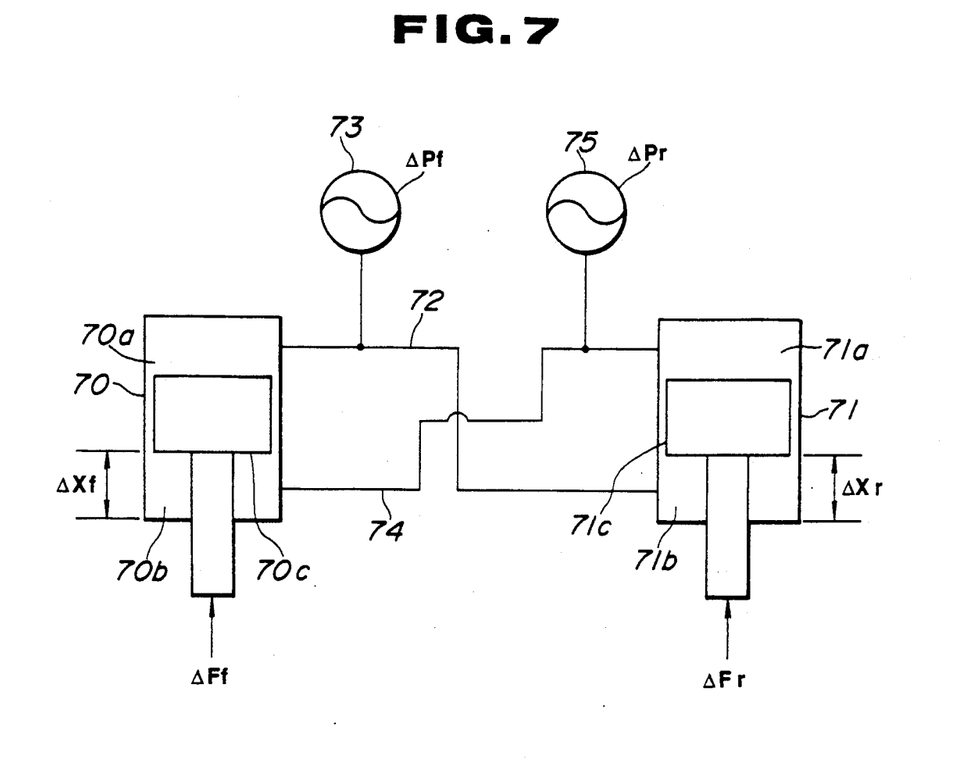
FIG. 7 is a diagrammatic illustration of a variable stabilizer for which the preferred embodiment of a suspension control system is also applicable.

FIG. 7 diagrammatically shows a variable stabilizer, for which the preferred embodiment of the suspension control system according to the present invention is applicable. In the shown construction, the variable stabilized comprises a pair of hydraulic cylinders 70 and 71 generally provided in front and rear suspension systems. The hydraulic cylinder 70 defines an upper fluid chamber 70a and a lower fluid chamber 70b. On the other hand, the hydraulic cylinder 71 defines an upper fluid chamber 71a and and a lower fluid chamber 71b. The upper fluid chamber 70a of the hydraulic cylinder 70 is connected to the lower fluid chamber 71b of the hydraulic cylinder 71 via a communication line 72. A pressure accumulator 73 is connected to the communication line 72. On the other hand, the upper fluid chamber 71a of the hydraulic cylinder 71 is connected to the lower fluid chamber 70b of the hydraulic cylinder 70 via a communication line 74. A pressure accumulator 75 is connected to the communication line 74. With the shown construction, assuming that the upward force ΔF$_f$ is exerted on the front wheel and a piston 70c of the hydraulic cylinder 70 strokes in a magnitude ΔX$_f$, upward force Δf (approximately corresponding to the upward force ΔF$_f$) is exerted on a piston 71c of the hydraulic cylinder 71 if the piston stroke of the piston 71c is zero. Assuming that the upward force ΔFr is exerted on the rear wheel and the piston 71c of the hydraulic cylinder 71 strokes in a magnitude ΔXr, upward force (approximately corresponding to the upward force ΔFr) is exerted on the piston 70c, if the piston stroke of the piston 70c is zero. By this stabilization effect can be obtained.

In the shown construction, when the vehicular driving condition is close to the critical point due to braking or cornering, and assuming wheel slippage is caused due to difference of road friction or unbalance of the wheel load on the wheels, downward force to be exerted on the hydraulic cylinders 70 and 71 is reduced. In such case, stabilization effect of the variable stabilizer similar to that in response to the upward force ΔF$_f$ can be obtained.

In the shown embodiment, wheel slippage dependent control can be performed for adjusting the wheel load for the wheel having the maximum wheel slippage by adjusting set pressure ΔP$_f$ and ΔP$_r$ of the pressure accumulators 73 and 75. By this, the equivalent effect for assurance of vehicle driving stability can be obtained.

Therefore, the present invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the shown embodiments have been directed to adjustment of the hydraulic or pneumatic pressure to be for active cylinders, it may be possible to adjust damping characteristics of variable shock absorber. Therefore, the suspension control system according to the present invention may be applicable for suspension systems employing variable damping characteristics shock absorber, such as that disclosed in the following prior patents, for example.

U.S. Pat. No. 4,686,626, issued on Aug. 11, 1987
U.S. Pat. No. 4,652,010, issued on Mar. 24, 1987
U.S. Pat. No. 4,796,911, issued on Jan. 10, 1989
U.S. Pat. No. 4,770,438, issued on Sept. 13, 1988
U.S. Pat. No. 4,600,215, issued on July 15, 1986

All of the above-identified U.S. Patents have been assigned to the common owner to the present invention, the disclosure of which are herein incorporated by reference for the sake of disclosure.

What is claimed is:

1. A suspension control system comprising:
   a suspension system disposed between a vehicle body and a suspension member pivotably mounted on a vehicle body and rotatably supporting a road wheel;
   first means, associated with said suspension system, for adjusting suspension characteristics for adjusting load exerted on said road wheel;
   second means, for monitoring preselected suspension control parameter for providing a first parameter data;
   third means for monitoring state of traction at said road wheel for producing a second parameter data; and
   fourth means, receiving said first and second parameter data, for controlling operation of said first means, said fourth means being active in a first mode while said second parameter data is greater than or equal to a predetermined threshold level, for controlling operation of said first means on the basis of said first parameter data, and a second mode while said second parameter data is smaller than said predetermined threshold level, for controlling operation of said first means so as to increase traction so that said second parameter data becomes greater than or equal to said predetermined threshold level.

2. A suspension control system as set forth in claim 1, wherein said suspension system comprises an active suspension system including a cylinder which has a variable pressure chamber for adjusting suspension characteristics, said variable pressure chamber being connected to a pressure control circuit including a pressure source unit and said first means comprising a pressure control valve which controls supplying and draining the fluid pressure in said variable pressure chamber.

3. A suspension control system as set forth in claim 2, wherein said fourth means operates in said second mode for supplying control signal for said pressure control valve in order to modify the fluid pressure in said variable pressure chamber derived on the basis of said first parameter data to be higher level in a predetermined magnitude.

4. A suspension control system as set forth in claim 3, wherein said fourth means derives said additional magnitude of pressure depending upon the level of traction in relation to said threshold level.

5. A suspension control system as set forth in claim 1, wherein said suspension system comprises a pneumatic suspension including a variable volume chamber which is connected to a pressurized air source, said first means comprises a pressure control means disposed within a circuit connecting said pressurized air source and said variable volume chamber for adjusting pressure in said variable volume chamber for adjusting suspension characteristics.

6. A suspension control system as set forth in claim 5, wherein said fourth means operates in said second mode for supplying control signal for said pressure control valve in order to modify the air pressure in said pressure control valve in order to the basis of said first parameter data to be higher level in a predetermined magnitude.

7. A suspension control system as set forth in claim 6, wherein said fourth means derives said additional magnitude of pressure depending upon the level of traction in relation to said threshold level.

8. A suspension control system as set forth in claim 1, wherein said suspension system comprises a variable stabilizer comprising a pair of first and second cylinders, said first cylinder defining first upper and second lower chambers opposing across a first thrusting piston, said second cylinder defining third upper and fourth lower chambers opposing across a second thrusting piston, said first chamber being communicated with said fourth chamber via a first line and said second chamber being communicated with said third chamber via a second line, and said first means being provided in said first and second lines for adjusting set pressure therein.

9. A suspension control system as set forth in claim 8, wherein said first means comprises a pressure accumulator variable of set pressure thereof, which pressure accumulator being connected to each of said first and second lines.

10. A suspension control system comprising:
    a suspension system disposed between a vehicle body and a suspension member pivotably mounted on a vehicle body and rotatably supporting a road wheel;
    first means, associated with said suspension system, for adjusting suspension characteristics for adjusting load exerted on said road wheel;
    second means, for monitoring preselected suspension control parameter for providing a first parameter data;
    third means for monitoring state of wheel slippage at said road wheel for producing a second parameter data; and
    fourth means, receiving said first and second parameter data, for controlling operation of said first means, said fourth means being active in a first mode while said second parameter data is smaller than or equal to a predetermined threshold level, for controlling operation of said first means on the basis of said first parameter data, and a second mode while said second parameter data is greater than said predetermined threshold level, for controlling operation of said first means so as to increase wheel slippage so that said second parameter data becomes smaller than or equal to said predetermined threshold level.

11. A suspension control system as set forth in claim 10, wherein said suspension system comprises an active suspension system including a cylinder which has a variable pressure chamber for adjusting suspension characteristics, said variable pressure chamber being connected to a pressure control circuit including a pressure source unit and said first means comprising a pressure control valve which controls supplying and draining the fluid pressure in said variable pressure chamber.

12. A suspension control system as set forth in claim 11, wherein said fourth means operates in said second mode for supplying control signal for said pressure control valve in order to modify the fluid pressure in said variable pressure chamber derived on the basis of said first parameter data to be higher level in a predetermined magnitude.

13. A suspension control system as set forth in claim 12, wherein said fourth means derives said additional magnitude of pressure depending upon the level of traction in relation to said threshold level.

14. A suspension control system as set forth in claim 10, wherein said suspension system comprises a pneumatic suspension including a variable volume chamber which is connected to a pressurized air source, said first means comprises a pressure control means disposed within a circuit connecting said pressurized air source and said variable volume chamber for adjusting pressure in said variable volume chamber for adjusting suspension characteristics.

15. A suspension control system as set forth in claim 14, wherein said fourth means operates in said second mode for supplying control signal for said pressure control valve in order to modify the air pressure in said variable volume chamber derived on the basis of said first parameter data to be higher level in a predetermined magnitude.

16. A suspension control system as set forth in claim 15, wherein said foruth means derives said additional magnitude of pressure depending upon the level of traction in relation to said threshold level.

17. A suspension control system as set forth in claim 10, wherein said suspension system comprises a variable stabilizer comprising a pair of first and second cylinders, said first cylinder defining first upper and second lower chambers opposing across a first thrusting piston, said second cylinder defining third upper and fourth lower chambers opposing across a second thrusting piston, said first chamber being communicated with said fourth chamber via a first line and said second chamber being communicated with said third chamber via a second line, and said first means being provided in said first and second lines for adjusting set pressure therein.

18. A suspension control system as set forth in claim 17, wherein said first means comprises a pressure accumulator variable of set pressure thereof, which pressure accumulator being connected to each of said first and second lines.

* * * * *